(12) United States Patent
    Tirelli

(10) Patent No.: US 11,358,696 B2
(45) Date of Patent: Jun. 14, 2022

(54) METHOD OF STARTING AN INTERNAL COMBUSTION ENGINE OF A HYBRID PROPULSION SYSTEM IN A MARINE VESSEL AND A HYBRID PROPULSION SYSTEM IN A MARINE VESSEL

(71) Applicant: WÄRTSILÄ FINLAND OY, Vaasa (FI)

(72) Inventor: Giulio Tirelli, Trieste (IT)

(73) Assignee: WÄRTSILÄ FINLAND OY, Vaasa (FI)

( * ) Notice: Subject to any disclaimer, the term of this patent is extended or adjusted under 35 U.S.C. 154(b) by 69 days.

(21) Appl. No.: 16/734,860

(22) Filed: Jan. 6, 2020

(65) Prior Publication Data
    US 2020/0140053 A1    May 7, 2020

Related U.S. Application Data

(63) Continuation of application No. PCT/EP2018/068211, filed on Jul. 5, 2018.

(30) Foreign Application Priority Data

Jul. 6, 2017    (FI) ..................... 20175655

(51) Int. Cl.
    *B63H 21/21*    (2006.01)
    *B63H 21/20*    (2006.01)
    (Continued)

(52) U.S. Cl.
    CPC ............ *B63H 21/21* (2013.01); *B63H 21/20* (2013.01); *F02B 61/04* (2013.01); *F02D 41/062* (2013.01);
    (Continued)

(58) Field of Classification Search
    CPC ........ B63H 2021/205; B63H 2021/216; B63H 21/20; B63H 21/21; B63H 23/12;
    (Continued)

(56) References Cited

U.S. PATENT DOCUMENTS 3,589,830 A * 6/1971 Mogren ................. B63H 25/46
                                                416/1
3,639,076 A * 2/1972 Rowen ................... G05D 13/62
                                                416/30

(Continued)

FOREIGN PATENT DOCUMENTS

CN        1970359 A    5/2007
CN      101713328 A    5/2010
(Continued)

OTHER PUBLICATIONS

International Preliminary Report on Patentability issued in corresponding International Patent Application No. EP2018/068211, 31 pages (dated Jun. 6, 2019).

(Continued)

*Primary Examiner* — Carl C Staubach
(74) *Attorney, Agent, or Firm* — Buchanan Ingersoll & Rooney PC

(57) ABSTRACT

A method of operating a marine vessel hybrid propulsion system having a propulsion shaft and a propeller, an internal combustion piston engine in force transmission connection with the propulsion shaft, and an electric motor-generator in force transmission connection with the propulsion shaft and/or with the piston engine. The internal combustion piston engine can be started by applying electric power from an on-board power source to the electric motor-generator and rotating the internal combustion piston engine by the electric motor-generator and rotational speed of the internal combustion piston engine is accelerated to a predetermined limit rotational speed without attempting to start the internal (Continued)

combustion piston engine, and only after the rotational speed of the internal combustion piston engine reaches the predetermined limit rotational speed, the internal combustion piston engine is started.

16 Claims, 3 Drawing Sheets

(51) Int. Cl.
    F02B 61/04 (2006.01)
    F02D 41/06 (2006.01)
    F02D 41/30 (2006.01)
    F02N 11/04 (2006.01)
    F02N 11/08 (2006.01)

(52) U.S. Cl.
    CPC .......... *F02D 41/3005* (2013.01); *F02N 11/04* (2013.01); *F02N 11/0859* (2013.01); *F02N 11/0862* (2013.01); *B63H 2021/205* (2013.01); *B63H 2021/216* (2013.01); *F02D 2200/023* (2013.01); *F02D 2200/101* (2013.01); *F02N 2200/022* (2013.01); *F02N 2200/023* (2013.01)

(58) Field of Classification Search
    CPC . B63H 23/18; B63H 3/10; B63J 99/00; F02B 61/04; F02D 2200/023; F02D 2200/101; F02D 41/062; F02D 41/3005; F02N 11/04; F02N 11/0859; F02N 11/0862; F02N 2200/022; F02N 2200/023
    See application file for complete search history.

(56) References Cited

U.S. PATENT DOCUMENTS

| | | | | |
|---|---|---|---|---|
| 4,880,402 | A * | 11/1989 | Muller | B63H 3/04 |
| | | | | 416/162 |
| 4,929,153 | A * | 5/1990 | Speer | B63H 3/008 |
| | | | | 416/139 |
| 4,929,201 | A * | 5/1990 | Pitt | B63H 3/082 |
| | | | | 416/147 |
| 6,396,161 | B1 | 5/2002 | Crecelius et al. | |
| 6,645,017 | B1 * | 11/2003 | Skrzypek | B63J 3/02 |
| | | | | 440/6 |
| 6,857,918 | B1 * | 2/2005 | Lebreux | B63B 34/10 |
| | | | | 440/6 |
| 7,270,621 | B2 | 9/2007 | Yamauchi | |
| 7,473,205 | B2 | 1/2009 | Shimizu et al. | |
| 8,062,081 | B2 * | 11/2011 | Barrett | B60K 5/08 |
| | | | | 440/1 |
| 8,122,983 | B2 | 2/2012 | Katsuta et al. | |
| 8,808,139 | B1 * | 8/2014 | Arbuckle | B60W 10/02 |
| | | | | 477/5 |
| 8,992,274 | B1 * | 3/2015 | Ward | B63H 21/20 |
| | | | | 440/87 |
| 10,059,417 | B1 * | 8/2018 | Hilbert | F02N 11/08 |
| 10,974,802 | B2 * | 4/2021 | Gjerpe | B60L 3/0061 |
| 2006/0100056 | A1 | 5/2006 | Yamauchi | |
| 2007/0049456 | A1 * | 3/2007 | Shimizu | B60W 10/08 |
| | | | | 477/3 |
| 2008/0064273 | A1 * | 3/2008 | Mizokawa | B63H 23/12 |
| | | | | 440/1 |
| 2010/0012405 | A1 | 1/2010 | Katsuta et al. | |
| 2010/0125383 | A1 * | 5/2010 | Caouette | B63H 21/21 |
| | | | | 701/21 |
| 2012/0101671 | A1 * | 4/2012 | Caouette | B63H 21/383 |
| | | | | 701/21 |
| 2016/0023740 | A1 * | 1/2016 | Skrzypchak | B63H 21/21 |
| | | | | 440/83 |
| 2016/0053690 | A1 * | 2/2016 | Perkinson | F02C 7/266 |
| | | | | 60/788 |
| 2017/0355258 | A1 * | 12/2017 | Hawksley | B63H 23/12 |
| 2018/0171884 | A1 * | 6/2018 | Ulrey | F02D 41/062 |

FOREIGN PATENT DOCUMENTS

| | | |
|---|---|---|
| CN | 102975841 A | 3/2013 |
| CN | 107161314 A | 9/2017 |
| GB | 592639 | 9/1947 |
| JP | 2006132466 A | 5/2006 |
| JP | 2007-055460 A | 3/2007 |
| JP | 2016088476 A | 5/2016 |
| WO | 2008-072417 A1 | 6/2008 |
| WO | 2010054466 A1 | 5/2010 |
| WO | 2012092503 A2 | 7/2012 |

OTHER PUBLICATIONS

International Search Report and Written Opinion issued in corresponding International Patent Application No. PCT/EP2018/068211, 12 pages (dated Sep. 10, 2018).

Office Action (Notice of Reason(s) for Rejection) dated Jan. 12, 2021, by the Japanese Patent Office in corresponding Japanese Patent Application No. 2019-572358, and an English Translation of the Office Action. (14 pages).

Office Action (First Notification of Office Action) dated Feb. 26, 2021, by the Chinese Patent Office in corresponding Chinese Patent Application No. 201880044389.6, and an English Translation of the Office Action. (22 pages).

Office Action (Communication) dated Apr. 19, 2021, by the European Patent Office in corresponding European Patent Application No. 18739824.3. (6 pages).

Office Action (Notice of Grounds for Rejection) dated Mar. 22, 2022, by the Korean Patent Office in corresponding Korean Patent Application No. 10-2019-7037404, and an English Translation of the Office Action. (22 pages).

* cited by examiner

METHOD OF STARTING AN INTERNAL COMBUSTION ENGINE OF A HYBRID PROPULSION SYSTEM IN A MARINE VESSEL AND A HYBRID PROPULSION SYSTEM IN A MARINE VESSEL

RELATED APPLICATIONS

This application claims priority as a continuation application under 35 U.S.C. § 120 to PCT/EP2018/068211, which was filed as an International Application on Jul. 5, 2018 designating the U.S., and which claims priority to Finnish Application 20175655 filed in Finland on Jul. 6, 2017. The entire contents of these applications are hereby incorporated by reference in their entireties.

FIELD

The present disclosure relates to a method of starting an internal combustion engine of a hybrid propulsion system in a marine vessel. An exemplary propulsion system as disclosed can include a propulsion shaft and a propeller assembled to the shaft, an internal combustion piston engine arranged mechanically connectable in force transmission connection with the propulsion shaft, an electric motor-generator arranged mechanically connectable in force transmission connection with the propulsion shaft and/or with the piston engine, in which method the internal combustion piston engine can be started by applying electric power from an on-board power source to the electric motor-generator and rotating the internal combustion engine by means of the electric motor-generator.

A hybrid propulsion system in a marine vessel is also disclosed.

BACKGROUND INFORMATION

Propulsion power in large ships has been produced by 2 stroke or 4 stroke internal combustion piston engines. Recently also so called hybrid propulsion has been under consideration for practical implementation.

For example in U.S. Pat. No. 6,396,161, the disclosure of which is hereby incorporated by reference in its entirety, discloses a marine integrated starter alternator troller device (ISAT) which includes a stator portion and a rotor portion connected to a drive shaft. The ISAT is incorporated into an engine assembly power train which includes an internal combustion engine having a crankshaft connected to an electric clutch. The electric clutch is operable to connect or disconnect the drive shaft and the crankshaft. Thus, the ISAT may be connected to or disconnected from the crankshaft of the internal combustion engine. When connected to the engine by the electric clutch, the ISAT device is operable to receive electrical power from a battery and act as a cranking motor to provide starting torque to the internal combustion engine. The ISAT may also be driven by the internal combustion engine and act as a generator to provide power to re-charge the battery or drive other electrical devices. When disconnected from the engine by the electric clutch, the ISAT receives electrical power from the battery and acts as a trolling motor to drive a propeller. A transmission is connected between the ISAT and the propeller such that rotation of the ISAT spins the propeller at a number of forward and reverse speeds.

The current and yet to come environmental regulations, particularly for internal combustion piston engines of the size capable of being arranged as propulsion prime movers in a large ship, are challenging. Starting a large piston engine operation according to diesel cycle has an issue of creating excess amount of pollution, such as unburned fuel, soot, carbon monoxide etc. before the combustion chamber and the charge air reaches temperature high enough to provide clean combustion. Also a lean burn gas engine can require accurate conditions, such as fuel-air ratio and compression ratio, to meet the environmental demands.

SUMMARY

A method is disclosed of starting an internal combustion engine of a hybrid propulsion system in a marine vessel, the hybrid propulsion system including: a propulsion shaft and a propeller assembled to the propulsion shaft; an internal combustion piston engine arranged mechanically connectably in force transmission connection with the propulsion shaft and the propeller; an electric motor-generator arranged mechanically connectably in force transmission connection with at least one of the propulsion shaft and with the internal combustion piston engine, which method comprises: starting the internal combustion piston engine by applying electric power from an on-board power source to the electric motor-generator and rotating the internal combustion piston engine by the electric motor-generator; and accelerating rotational speed of the internal combustion piston engine to a predetermined limit rotational speed without attempting to start the internal combustion piston engine, and only after the rotational speed of the internal combustion piston engine reaches the predetermined limit rotational speed, the internal combustion piston engine is started; wherein the internal combustion piston engine is started while providing power to the propeller of the marine vessel by the electric motor-generator and propulsion power is controlled by controlling pitch of a controllable pitch propeller assembled to the propulsion shaft.

A hybrid propulsion system is also disclosed for a marine vessel, comprising: a propulsion shaft; a propeller assembled to the shaft; an internal combustion piston engine arranged mechanically connectable in force transmission connection with the propulsion shaft; an electric motor-generator arranged mechanically connectable in force transmission connection with at least one of the propulsion shaft and with the piston engine; and a computer controller unit for operating the hybrid propulsion system, which computer controller unit includes a computer configured to control operation of the hybrid propulsion system, and a computer program stored in the computer; wherein the computer program includes instructions to apply electric power from an on-board power source to the electric motor-generator and rotate the internal combustion piston engine by the electric motor-generator for starting the piston engine; wherein the computer program includes instructions to provide power to accelerate rotational speed of the internal combustion piston engine to a predetermined limit rotational speed without attempting start the internal combustion piston engine, and only after the rotational speed of the internal combustion piston engine reaches the predetermined limit rotational speed, to start the internal combustion piston engine; wherein the computer program includes instructions to start the engine and simultaneously provide power to the propeller of the marine vessel by the electric motor-generator; and wherein the computer program includes instructions to control propulsion power by controlling pitch of the propeller assembled to the propulsion shaft.

BRIEF DESCRIPTION OF THE DRAWINGS

In the following, exemplary embodiments of the invention will be described with reference to the accompanying exemplary, schematic drawings, in which.

DETAILED DESCRIPTION

Figure 1:
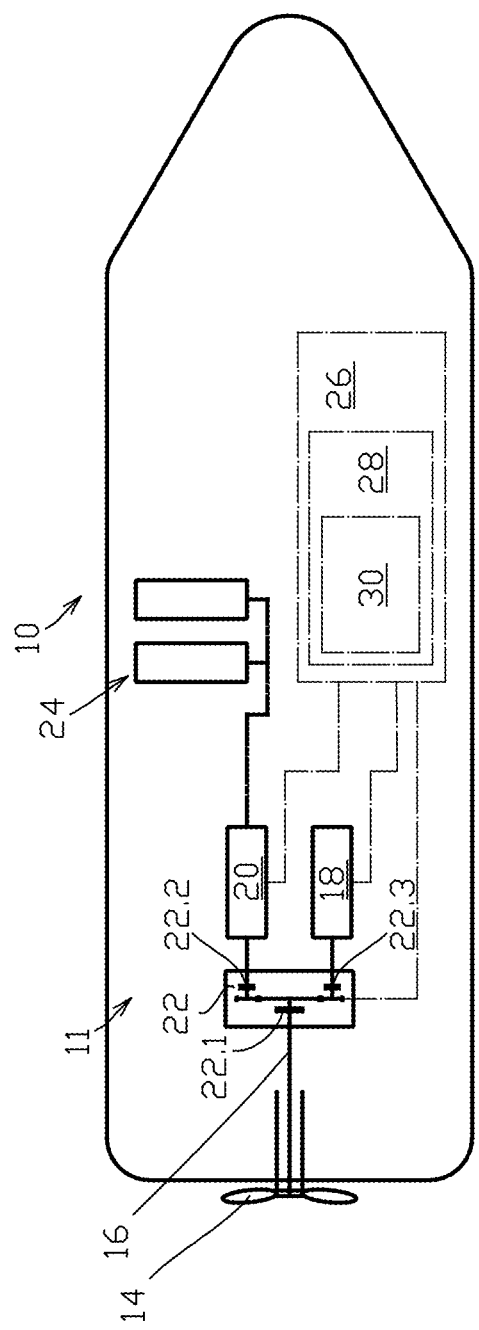
FIG. 1 illustrates a hybrid propulsion system according to an exemplary embodiment disclosed herein.

A method of starting an internal combustion piston engine of a hybrid propulsion system in a marine vessel and a hybrid propulsion system are disclosed, in which performance can be considerably improved compared to the known solutions.

According to an exemplary embodiment a method of starting an internal combustion engine of a hybrid propulsion system in a marine vessel, is disclosed, in which the propulsion system can include a propulsion shaft and a propeller assembled to the shaft, an internal combustion piston engine arranged mechanically connectable in force transmission connection with the propulsion shaft, and an electric motor-generator arranged mechanically connectable in force transmission connection with the propulsion shaft and/or with the piston engine, in which method the internal combustion piston engine is started by applying electric power from an on-board power source to the electric motor-generator and rotating the internal combustion piston engine by the electric motor-generator while providing power to the propeller of the marine vessel. Further, the rotational speed of the internal combustion piston engine can be accelerated to a predetermined limit rotational speed without attempting to start the internal combustion piston engine and only after the rotational speed of the internal combustion piston engine reaches the predetermined limit rotational speed, the internal combustion piston engine is started.

The predetermined limit rotational speed for example, is a speed at which successive compression strokes heat the cylinders of the engine to a required (e.g., specified) temperature at which combustion of the fuel as such is smokeless.

According to an exemplary embodiment the rotational speed of the propulsion shaft and the internal combustion piston engine is adjusted to reach the predetermined limit rotational speed, and propulsion power is controlled by controlling pitch of the propeller assembled to the propulsion shaft.

According to an exemplary embodiment the predetermined limit rotational speed is a speed at which successive compression strokes heats the cylinders of the engine to a required (e.g., specified) temperature at which fuel oil, such a heavy fuel oil, diesel fuel oil or marine fuel oil is ignited by compression ignition such that smokeless operation is obtained from the beginning of combustion.

According to an exemplary embodiment the engine is started by starting fuel injection and the fuel is ignited by compression ignition.

The predetermined limit rotational speed is an engine-specific value which is stored in the speed at which successive compression strokes heats the cylinders of the engine to a required (e.g., specified) temperature at which the combustion of the fuel as such is smokeless.

According to exemplary embodiments, the initial fuel injection takes place only after combustion chamber components are at temperature high enough for compression ignition of the fuel and/or combustion chamber components are at temperature high enough for complete and stable combustion, and the auxiliaries of the engine, such as the turbocharger and the fuel pumps have reach adequate operational state. The result of such a starting procedure is a complete and efficient combustion. Furthermore, the combustion can take place in an optimal condition from the very start avoiding or at least minimizing the production of dark smoke (particles) and emissions. This point becomes particularly important when, for example, happening in emission controlled areas or close to densely populated areas.

According to an exemplary embodiment, as the rotational speed of the internal combustion piston engine is accelerated and the engine is started, the electric motor-generator is arranged mechanically in force transmission connection with the propulsion shaft and with the piston engine, and the rotational speed of the propulsion shaft and the internal combustion piston engine is adjusted to reach the predetermined limit rotational speed of the internal combustion piston engine.

According to an exemplary embodiment the rotational speed of the propulsion shaft and the internal combustion piston engine is adjusted by increasing the rotational speed to reach the predetermined limit rotational speed.

According to an exemplary embodiment the rotational speed of the internal combustion piston engine is ruled (e.g., controlled) by the rotational speed demand of the propulsion shaft the predetermined limit rotational speed of the engine, and the rotational speed of the internal combustion piston engine is increased to a speed corresponding the rotational speed demand of the propulsion shaft exceeding the predetermined limit rotational speed, before starting the engine.

According to an exemplary embodiment rotational speed of the internal combustion piston engine is accelerated to a predetermined limit rotational speed and is cranked for a predetermined limit period of time without attempting to start the internal combustion piston engine, and only after the rotational speed of the internal combustion piston engine reaches the predetermined limit rotational speed and the cranking time reaches a limit period of cranking time, the internal combustion piston engine is started.

According to an exemplary embodiment the predetermined limit rotational speed is a function of the limit period of cranking time.

According to an exemplary embodiment after the engine has stated the propulsion power may be completely obtained from the engine and the electric motor-generator can continue to be utilized as power take in/off for power peak cutting purposes, on-board energy production or power boost.

Making use of a computer controller unit makes it possible to use an automation procedure to implement exemplary embodiments of the method.

A hybrid propulsion system for use in a marine vessel as disclosed can include a propulsion shaft and a propeller assembled to the shaft, an internal combustion piston engine arranged mechanically connectable in force transmission connection with the propulsion shaft, an electric motor-generator arranged mechanically connectable in force transmission connection with the propulsion shaft and/or with the piston engine, a computer configured to control operation of the hybrid propulsion system and a computer program stored in the computer, which computer program can include instructions to apply electric power from an on-board power source to the electric motor-generator and rotate the internal combustion piston engine by the electric motor-generator for starting the piston engine. The computer program can include instructions to simultaneously provide power to the propeller and to accelerate the rotational speed of the internal combustion piston engine to a predetermined limit rotational speed without attempting to start the internal combustion piston engine, and only after the rotational speed of the internal combustion piston engine reaches the predetermined limit rotational speed, to start the internal combustion piston engine, and the computer program can include instructions to connect the electric motor-generator mechanically in force transmission with the propulsion shaft and with the piston engine.

According to an exemplary embodiment the computer program can include instructions to adjust the rotational speed of the propulsion shaft and the internal combustion piston engine to reach the predetermined limit rotational speed, and to control the propulsion power by controlling pitch of the propeller assembled to the propulsion shaft.

According to an exemplary embodiment the computer program can include instructions to increase the rotational speed of the propulsion shaft and the internal combustion piston engine to reach the predetermined limit rotational speed.

According to an exemplary embodiment the computer program can include instructions to adjust the rotational speed of the internal combustion piston engine based on the rotational speed demand of the propulsion shaft.

According to an exemplary embodiment the computer program can include instructions to accelerate the rotational speed of the internal combustion piston engine to a predetermined limit rotational speed and to crank the engine for a predetermined limit period of time without attempting to start the internal combustion piston engine, and instructions to start the piston engine only after the rotational speed of the internal combustion piston engine reaches the predetermined limit rotational speed and the cranking time reaches a limit period of cranking time.

According to an exemplary embodiment the computer program can include instructions to set the predetermined limit rotational speed as a function of the limit period of cranking time.

According to an exemplary embodiment the computer program can include instructions to start fuel injection only after combustion chamber components are at temperature high enough (i.e., sufficient) for compression ignition, or at any specified temperature.

Exemplary instructions referred to in connection with computer, when executed by a computer, cause the computer to carry out a method as disclosed herein. Exemplary embodiments can provide several exemplary advantages. The combustion components of the engine have been compressing air before the first fuel injection and ignition. This results in warmer components. The turbocharger(s) are already rotating at higher speed, providing quite a high amount of combustion air. The fuel pressure is already high, thanks to higher-than-usual engine starting rotational speed, and the fuel is sprayed in an optimal (i.e., enhanced) way. The required (e.g., specified) amount of fuel is injected in a controlled way. A complete and optimized combustion produces lower emissions compared to a normal starting procedure and there is no need for installing the compressed air starting equipment and related system for engine.

The exemplary embodiments presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated. The novel features which are considered as characteristic of the invention are set forth in particular in the appended claims.

FIG. 1 depicts schematically an exemplary marine vessel 10. The marine vessel is provided with an exemplary propulsion system 12. The propulsion system 12 includes in turn a propeller 14 and a propulsion shaft 16 into which the propeller 14 has been assembled. The propulsion system may also be a so called thruster. The marine vessel 10 includes at least one internal combustion piston engine 18 which engine 18 is arranged mechanically connectably in force connection with the propulsion shaft 16 via a clutch/transmission unit 22.

The marine vessel 10 includes also at least one electric motor-generator 20 which is also arranged mechanically connectably in force transmission connection with the propulsion shaft 16. The electric motor-generator is also arranged mechanically connectably in force transmission connection with the internal combustion piston engine 18. The clutch/transmission unit 22 includes a first clutch 22.1 which couples or uncouples the propulsion shaft 16 to the clutch/transmission unit 22 and a second clutch 22.2 which couples or uncouples the electric motor-generator 20 to the clutch/transmission unit 22 and a third clutch 22.3 which couples or uncouples the engine 18 to the clutch/transmission unit 22.

The vessel is also provided with on-board electric power source 24, which may include e.g. batteries, capacitors, fuel cells and/or wind power plant. The power source 24 is connected to the electric motor-generator. The vessel is also provided with a computer controller unit 26 which is configured to control hybrid propulsion system 11 of the vessel. These together constitute a hybrid propulsion system 11 of the marine vessel 10.

This kind propulsion system is very versatile in handling and using available power for propulsion. According to an exemplary embodiment the internal combustion piston engine 18 is started by applying electric power from the onboard power source 24 to the electric motor-generator 20 and the internal combustion piston engine is rotated (cranked) by means of, for example, the electric motor-generator such that the rotational speed of the internal combustion piston engine 18 is accelerated to a predetermined limit rotational speed without attempting to start the internal combustion the piston engine, and only after the rotational speed of the internal combustion piston engine reaches the predetermined limit rotational speed, the internal combustion piston engine is started.

The steps of attempting to start the engine includes necessary and/or desired actions or operations to feed fuel into the engine and have the fuel ignited and combusted. As the rotational speed of the internal combustion piston engine is accelerated by the electric motor-generator and the engine is finally started, the electric motor-generator is arranged mechanically in force transmission connection with the propulsion shaft 16 and with the piston engine 18. This means that the all of the clutches 22.1-22.3 of the clutch/transmission unit 22 are engaged to transmit mechanical power. The rotational speed of the propulsion shaft 16 and the internal combustion 18 piston engine is adjusted to reach the predetermined limit rotational speed of the internal combustion piston engine 18. In practice this means that the computer controller unit controls the speed of the electric motor-generator 20 to be such that the predetermined limit rotational speed of the internal combustion piston engine 18 is achieved before starting of the engine. Simultaneously the propulsion shaft 16 and the propeller 14 are rotated with a rotational speed ruled by the speed of the electric motor-generator 20 and the gear ratio of the clutch/transmission unit 22.

When the engine starting procedure is initiated the rotational speed of the propulsion shaft 16 and the internal combustion piston engine 18 are adjusted by increasing the rotational speed to reach.

According to an exemplary embodiment the rotational speed of the internal combustion piston 18 engine is ruled by the rotational speed demand of the propulsion shaft and the predetermined (e.g., controlled) limit rotational speed of the engine 18, and both of these must, in this exemplary embodiment, be met before the engine is started. Thus the rotational speed of the internal combustion piston engine is increased to a speed corresponding the rotational speed demand of the propulsion shaft exceeding the predetermined limit rotational speed, before starting the engine.

The hybrid propulsion system 11 makes it also possible to run the vessel such that the rotational speed of the internal combustion piston engine 18 is accelerated to a predetermined limit rotational speed and is further cranked for a predetermined limit period of time without attempting start the internal combustion piston engine. And, only after the rotational speed of the internal combustion piston engine reaches the predetermined limit rotational speed and the cranking time reaches a limit period of cranking time, the internal combustion piston engine is started.

According to an exemplary embodiment the predetermined limit rotational speed is a function of the limit period of cranking time. According to the exemplary embodiment shown in the FIG. 1 the vessel is provided with fixed pitch propeller and when the rotational speed of the propulsion shaft 16 and the internal combustion piston engine 18 are adjusted to reach the predetermined limit rotational speed the rotational speed of the propeller, and thus also the thrust, is momentarily increased. That is acceptable in a marine vessel because only a momentary increase of thrust will not increase the speed of the vessel considerably. That is acceptable at least when the vessel is at open sea or the circumstances otherwise make that possible.

Figure 2:
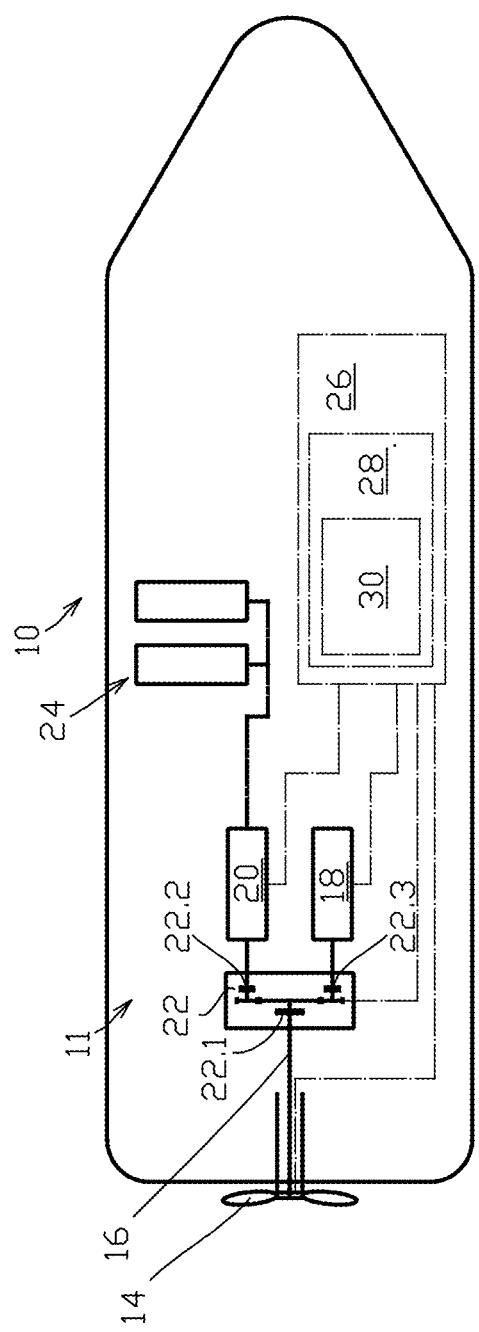
FIG. 2 illustrates a hybrid propulsion according to another exemplary embodiment disclosed herein.

In FIG. 2 there is shown an exemplary embodiment where, in addition to all the features of the FIG. 1, the propeller 14 is a controllable pitch propeller. In this embodiment the rotational speed of the propulsion shaft 16 and the internal combustion piston 18 engine are adjusted to reach the predetermined limit rotational speed, and propulsion power is controlled by controlling pitch of the propeller 14 assembled to the propulsion shaft. This way the engine may be rotated at desired speed, and even if the propulsion shaft 16 rotates synchronized with the engine, the propulsion power is independently controlled by control of the actual pitch of the propeller 14.

The computer controller unit 26 for operating the hybrid propulsion system can include a computer 28 configured to control the operation of the hybrid propulsion system 11 and a computer program 30 stored in the computer 28, which computer program 30 can include instruction to apply electric power from an on-board power source to the electric motor-generator and rotate the internal combustion piston engine by means of the electric motor-generator, and also instructions to accelerate the rotational speed of the internal combustion piston engine to a predetermined limit rotational speed without attempting to start the internal combustion piston engine 18 and only after the rotational speed of the internal combustion piston engine reaches the predetermined limit rotational speed, to start the internal combustion piston engine. The computer program can include instructions to connect the electric motor-generator mechanically in force transmission with the propulsion shaft 16 and with the piston engine 18.

The computer control unit can include an engine-specific value of the predetermined limit rotational speed which is used for controlling to operate electric motor-generator 20 to rotate or crank the engine at required (e.g., specified) speed prior to stating the engine. The computer control unit 26 acquires or obtains the actual rotational speed of the engine 18.

The computer program can include instructions to adjust the rotational speed of the internal combustion piston engine based on the rotational speed demand of the propulsion shaft. The computer program can include instructions to adjust the rotational speed of the propulsion shaft and the internal combustion piston engine to reach the predetermined limit rotational speed, and to control the propulsion power by controlling pitch of the propeller assembled to the propulsion shaft.

The computer program 30 can include instructions to accelerate the rotational speed of the internal combustion piston engine 18e to a predetermined limit rotational speed and to crank the engine for a predetermined limit period of time without attempting to start the internal combustion piston 18 engine, and instructions to start the piston engine only after the rotational speed of the internal combustion piston engine 18 reaches the predetermined limit rotational speed and the cranking time reaches a limit period of cranking time.

The computer program also can include instructions to set the predetermined limit rotational speed as a function of the limit period of cranking time.

Figure 3:
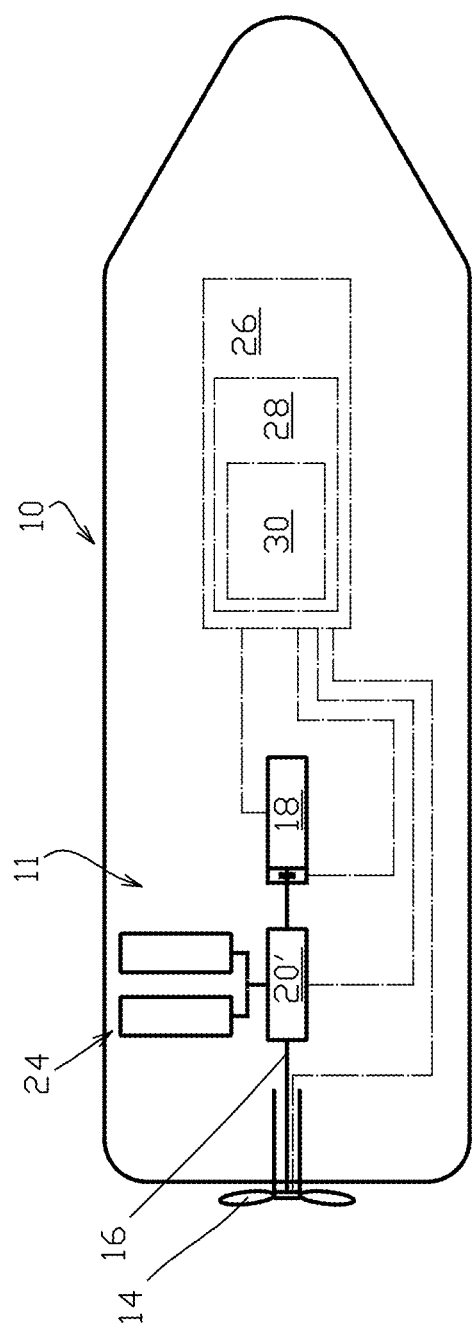
FIG. 3 illustrates a hybrid propulsion system according to still another exemplary embodiment disclosed herein.

The exemplary embodiments shown in the FIGS. 1 and 2 include the clutch/transmission unit 22 which results in versatile possibilities in controlling the operation of the hybrid propulsion system. In FIG. 3 there is shown an exemplary embodiment where the electric motor-generator 20 is a shaft motor/generator 20', directly coupled thereto. In this embodiment the electric motor-generator is mechanically continuously connected to the propulsion shaft 16. The engine 18 may be provided with a clutch/transmission unit 22'. This way, the electric motor-generator 22' and the propeller 14 are always coupled with each other and the engine 18 is selectively coupled with propulsion shaft 16.

While the invention has been described herein by way of examples in connection with what are, at present, considered to be the most preferred exemplary embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with other embodiments when such combination is technically feasible.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of starting an internal combustion engine of a hybrid propulsion system in a marine vessel, the hybrid propulsion system including:
   a propulsion shaft and a propeller assembled to the propulsion shaft;
   an internal combustion piston engine arranged mechanically connectably in force transmission connection with the propulsion shaft and the propeller;
   an electric motor-generator arranged mechanically connectably in force transmission connection with at least one of the propulsion shaft and with the internal combustion piston engine, which method comprises:
   starting the internal combustion piston engine by applying electric power from an on-board power source to the electric motor-generator and rotating the internal combustion piston engine by the electric motor-generator; and
   accelerating rotational speed of the internal combustion piston engine to a predetermined limit rotational speed without attempting to start the internal combustion piston engine, and only after the rotational speed of the internal combustion piston engine reaches the predetermined limit rotational speed, the internal combustion piston engine is started;
   wherein the internal combustion piston engine is started while providing power to the propeller of the marine vessel by the electric motor-generator such that the propulsion shaft rotates synchronized with the rotational speed of the internal combustion piston engine during start and, while the internal piston engine is starting, propulsion power is controlled by controlling pitch of a controllable pitch propeller assembled to the propulsion shaft.

2. The method of starting an internal combustion engine of a hybrid propulsion system in a marine vessel according to claim 1, comprising:
   adjusting, as rotational speed of the internal combustion piston engine is accelerated and the engine is started, with the electric motor-generator being arranged mechanically in force transmission connection with the propulsion shaft and with the piston engine, rotational speed of the propulsion shaft and the internal combustion piston engine to reach the predetermined limit rotational speed of the internal combustion piston engine.

3. The method of starting an internal combustion engine of a hybrid propulsion system in a marine vessel according to claim 1, comprising:
   adjusting rotational speed of the propulsion shaft and the internal combustion piston engine by increasing the rotational speed to reach the predetermined limit rotational speed.

4. The method of starting an internal combustion engine of a hybrid propulsion system in a marine vessel according to claim 1, comprising:
   controlling rotational speed of the internal combustion piston engine by the rotational speed demand of the propulsion shaft and the predetermined limit rotational speed; and
   increasing the rotational speed of the internal combustion piston engine to a speed corresponding the rotational speed demand of the propulsion shaft exceeding the predetermined limit rotational speed, before starting the engine.

5. The method of starting an internal combustion engine of a hybrid propulsion system in a marine vessel according to claim 1, comprising:
   accelerating rotational speed of the internal combustion piston engine to a predetermined limit rotational speed cranking the engine for a predetermined limit period of time without attempting start the internal combustion piston engine; and
   only after the rotational speed of the internal combustion piston engine reaches the predetermined limit rotational speed and a cranking time reaches a limit period of cranking time, starting the internal combustion piston engine.

6. The method of starting an internal combustion engine of a hybrid propulsion system in a marine vessel according to claim 5, wherein predetermined limit rotational speed is a function of the limit period of cranking time.

7. A hybrid propulsion system for a marine vessel, comprising:
   a propulsion shaft;
   a propeller assembled to the shaft;
   an internal combustion piston engine arranged mechanically connectable in force transmission connection with the propulsion shaft;
   an electric motor-generator arranged mechanically connectable in force transmission connection with at least one of the propulsion shaft and with the piston engine; and
   a computer controller unit for operating the hybrid propulsion system, which computer controller unit includes a computer configured to control operation of the hybrid propulsion system, and a computer program stored in the computer;
   wherein the computer program includes instructions to apply electric power from an on-board power source to the electric motor-generator and rotate the internal combustion piston engine by the electric motor-generator for starting the piston engine;
   wherein the computer program includes instructions to provide power to accelerate rotational speed of the internal combustion piston engine to a predetermined limit rotational speed without attempting start the internal combustion piston engine, and only after the rotational speed of the internal combustion piston engine reaches the predetermined limit rotational speed, to start the internal combustion piston engine;
   wherein the computer program includes instructions to start the engine and simultaneously provide power to the propeller of the marine vessel by the electric motor-generator such that the propulsion shaft rotates synchronized with the rotational speed of the internal combustion piston engine during start;
   wherein the computer program includes instructions to, while the internal combustion piston engine is starting, control propulsion power by controlling pitch of the propeller assembled to the propulsion shaft.

8. The hybrid propulsion system for a marine vessel according to claim 7, wherein the computer program comprises:
   instructions to connect the electric motor-generator mechanically in force transmission with the propulsion shaft and with the piston engine.

9. The hybrid propulsion system for a marine vessel according to claim 7, wherein the computer control unit comprises:
   an engine-specific value of the predetermined limit rotational speed.

10. The hybrid propulsion system for a marine vessel according to claim 7, wherein the computer program comprises:
  instructions to increase rotational speed of the propulsion shaft and the internal combustion piston engine to reach the predetermined limit rotational speed.

11. The hybrid propulsion system for a marine vessel according to claim 7, wherein the computer program comprises:
  instructions to adjust rotational speed of the internal combustion piston engine based on rotational speed demand of the propulsion shaft.

12. The hybrid propulsion system for a marine vessel according to claim 7, wherein the computer program comprises:
  instructions to accelerate rotational speed of the internal combustion piston engine to a predetermined limit rotational speed and to crank the engine for a predetermined limit period of time without attempting to start the internal combustion piston engine, and instructions to start the piston engine only after the rotational speed of the internal combustion piston engine reaches the predetermined limit rotational speed and a cranking time reaches a limit period of cranking time.

13. The hybrid propulsion system for a marine vessel according to claim 12, wherein the computer program comprises:
  instructions to set the predetermined limit rotational speed as a function of the limit period of cranking time.

14. The hybrid propulsion system for a marine vessel according to claim 7, in combination with:
  a marine vessel having a hull.

15. The method of starting an internal combustion engine of a hybrid propulsion system in a marine vessel according to claim 1, wherein predetermined limit rotational speed is a speed at which successive compression strokes heat cylinders of the engine to a specified temperature at which combustion of fuel by the engine is smokeless.

16. The method of starting an internal combustion engine of a hybrid propulsion system in a marine vessel according to claim 15, wherein fuel injection takes place only after combustion chamber components are at temperature sufficient for complete and stable combustion.

* * * * *